US006614612B1

(12) United States Patent
Menegoli et al.

(10) Patent No.: US 6,614,612 B1
(45) Date of Patent: Sep. 2, 2003

(54) EMBEDDED PROGRAMMABLE FILTER FOR DISK DRIVE VELOCITY CONTROL

(75) Inventors: Paolo Menegoli, San Jose, CA (US); Ender Tunc Eroglu, Campbell, CA (US); Whitney Hui Li, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 543 days.

(21) Appl. No.: 09/625,068

(22) Filed: Jul. 25, 2000

(51) Int. Cl.[7] ............................................... G11B 15/46
(52) U.S. Cl. ................................................... 360/73.03
(58) Field of Search ........................... 360/73.03, 73.01, 360/60, 75; 369/44.28, 47.39

(56) References Cited

U.S. PATENT DOCUMENTS

| | | | | |
|---|---|---|---|---|
| 4,710,825 A | * | 12/1987 | Okita et al. ................. | 386/119 |
| 5,412,629 A | * | 5/1995 | Shirane .................... | 369/47.39 |
| 5,768,226 A | * | 6/1998 | Ogino .................... | 369/44.28 |
| 6,233,110 B1 | * | 5/2001 | Suzuki .................... | 360/73.03 |
| 6,487,033 B1 | * | 11/2002 | Heydt et al. .................. | 360/60 |
| 6,498,446 B1 | * | 12/2002 | Menegoli et al. ........... | 318/254 |
| 6,512,650 B1 | * | 1/2003 | Tanner ........................ | 360/75 |

* cited by examiner

*Primary Examiner*—David Hudspeth
*Assistant Examiner*—Fred F. Tzeng
(74) *Attorney, Agent, or Firm*—Lisa K. Jorgenson; Andre Szuwalski

(57) ABSTRACT

A disk drive having a motor and a velocity control loop, which includes a frequency detector and a filter. The filter includes a filter section and an accumulator. The filter is programmable in that filter coefficient(s) are dynamically received by the filter section. One embodiment of the filter section is an infinite impulse response filter. One embodiment of the filter is a digital integrated circuit. A method for compensating a control loop by infinite impulse response filtering and accumulating. The control loop may be a position, velocity, acceleration or force control loop. A programmable digital integrated circuit for compensating a velocity control loop having a filter section cascaded with an accumulator. The integrated circuit may include memory for storing filter coefficient(s) for the filter section, thereby not requiring external components.

35 Claims, 3 Drawing Sheets

EMBEDDED PROGRAMMABLE FILTER FOR DISK DRIVE VELOCITY CONTROL

BACKGROUND OF THE PRESENT INVENTION

1. Field of the Invention

The present invention generally relates to automatic control systems, and more specifically, relates to compensation or filter devices within control loops.

2. Description of the Related Art

Automatic control systems for electro-mechanical devices have control loops that perform certain functions. Control loops vary depending upon the type of control necessary for the electro-mechanical device to perform its intended act. Generally, such loops comprise position, velocity, acceleration, or force control loops, for example, to control these physical properties. The discussion hereafter focuses on a velocity control loop for a disk drive, but is additionally applicable to the other types of control loops.

Disk drives of today face more challenges than ever due to their use and requirements. No longer are disk drives simply faced with operating in a controlled, stationary environment as when mainframe or desktop computers were the primary usages of disk drives. Today's disk drives are used in portable computers, portable CD players, and other electronic devices. Furthermore, there is a technological need for disk drives to be reduced in size and weight and be more robust to external disturbances and environmental conditions.

Stresses placed on today's disk drives, such as acoustic noise, motor wear out, motor torque ripple, and motor speed control accuracy demand more robust, fast response automatic control system designs for regulating the speed of the sinusoidal spindle motor within the disk drive. A velocity control loop within the automatic control system plays an important role in not only maintaining a constant spin velocity of the disk, but also in compensating for the mechanical dynamics of, and the external disturbances applied to the disk drive.

Disk drives have a velocity control loop operating within an automatic control system for controlling and regulating the velocity of the sinusoidal spindle motor to spin at a constant velocity. To maintain the constant velocity, the velocity control loop receives a reference frequency input signal. A feedback frequency signal output from the sinusoidal spindle motor is compared to the reference frequency input signal to determine if a delta or error therebetween exists. A compensator or filter may be used to compensate the error, with the filtered error used to control a drive circuit that regulates the velocity of the disk motor.

The mechanical dynamics of the disk drive are defined by the mechanical design of the disk drive. The spindle motor contains dynamics, such as resonance frequencies, which may be modeled by a transfer function having poles and zeros, as is commonly known to one of ordinary skill in the art of automatic control systems. Performance of the disk drive system, which includes the spindle motor and automatic control system, is dictated by the effectiveness of compensation placed into the velocity control loop thereof. Performance from a control system point of view includes stability and tracking. Stability is a function of gain and phase margins. Tracking is a reflection of gain. Without compensating (i.e., filtering) the velocity control loop, the disk drive would oscillate due to the spindle motor having a low frequency pole (i.e., long time constant).

Conventional compensators within velocity control loops are analog devices or alternatively comprise software operating within either a microprocessor or signal processor. A conventional analog design of a compensator to operate within a velocity control loop comprises an analog circuit, possibly including a single integrated circuit (i.e., chip). In order to provide compensation characteristics (i.e., poles and zeros) using these analog integrated circuit compensators, however, external passive components (i.e., resistors and capacitors) are necessary. Using the external passive components increases manufacturing costs, control loop size, and power consumption. Also, an analog integrated circuit degrades performance of the system due to current leakage and electromagnetic noise effects. The current leakage is generally due to environmental factors, such as temperature and humidity, making velocity control more difficult and less accurate.

Two conventional ways that microprocessor based velocity control loops perform include: (1) detecting the motor frequency and passing the motor frequency to the microprocessor, which may or may not have a controller having on-board filtering components, and (2) measuring the spindle motor frequency and filtering the measured signal using a digital filter on-board the microprocessor. Both of these approaches have a drawback of requiring the microprocessor to be-interrupted to receive the measured motor frequency and to perform the filtering for the velocity control. Additionally, if a processor is operating not only a velocity control loop, but also operating one or more control loops and performing other tasks within the system, the processor will likely have its processing resources stressed.

One problem with the conventional compensators or filters is analog filters cannot have dynamic modification of filter coefficients. Digital filters implemented as software within general processors that control other portions of the system are interrupted at each sample interval to perform filter processing. Another problem with conventional compensators is that the compensation, in general, is second order or higher and the compensators are implemented as second order or higher filters, thereby increasing processing time.

SUMMARY OF THE INVENTION

In accordance with the principles of the present invention, one embodiment for overcoming the shortcomings of the conventional compensators is a disk drive having a motor for spinning a disk and a velocity control loop, which includes a frequency detector and a filter. The frequency detector, which generates an error signal, is connected to an input terminal and an output terminal of the velocity control loop. The filter is at least a second order filter connected to an output terminal of the frequency detector. The filter includes a filter section and an accumulator. At least one filter coefficient is received by the filter section, which is at least a first order filter. One embodiment of the filter section is an infinite impulse response filter. The filter coefficient(s) define a transfer function for the filter. One embodiment of the filter is a digital integrated circuit.

Another embodiment of the present invention is a method for compensating a control loop within an automatic control system. An input signal is received and filtered. The filtering includes performing an infinite impulse response filtering, accumulating the signal produced by the infinite impulse response filtering, and outputting the accumulated signal. The control loop may be a position, velocity, acceleration or force control loop. Filter coefficient(s) are dynamically received and applied to the infinite impulse response filtering.

Another embodiment of the present invention is a programmable digital integrated circuit having a filter section cascaded with an accumulator. The filter section, being at least a first order filter, utilizes at least one filter coefficient dynamically received on a bus, such as a serial bus, to compensate an input signal to produce a first compensated signal. The accumulator receives the first compensated signal and produces a second compensated signal, which is an output signal from the integrated circuit. The integrated circuit further includes memory elements to store the filter coefficients, thereby eliminating the need for external components. An alternate embodiment is a hybrid having an analog section and a digital section.

BRIEF DESCRIPTION OF THE DRAWINGS

A more complete understanding of the system, method, and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Automatic control systems provide control for the operation of mechanical devices, systems, or processes. Direct current (DC) motors are one type of motor that may be controlled by an automatic control system. Control of DC motors generally includes rotational velocity or speed control. When performing velocity control, a velocity feedback control loop is utilized.

A filter or compensator is typically necessary for feedback control loops to stabilize the electrical and mechanical dynamics of the system-being controlled by the automatic control system. The principles of the present invention are directed to the form and operation of the filter within a feedback control loop.

Figure 1A:
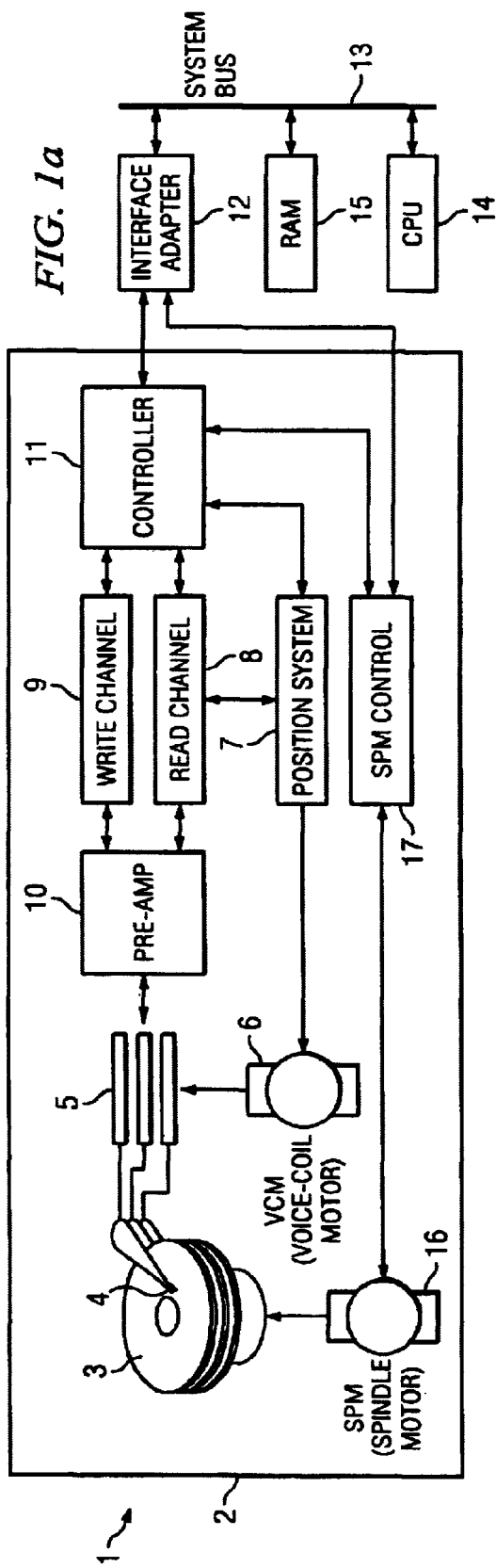
FIG. 1a is a function block diagram of a system having a disk drive according to a preferred embodiment of the present invention.

Referring to FIG. 1a, there is shown a block diagram of a data storage and/or computer system 1 including a disk drive 2 in accordance with the present invention. Disk drive 2 includes a storage medium in the form of one or more disks 3, each of which may contain data on both sides of the disk. Data is written to disks 3 and/or read therefrom by one or more read/write heads 4. The read/write head 4 is connected to an arm 5, with both read/write head 4 and arm 5 being positionally controlled by a voice-coil motor ("VCM") 6 and a position system 7. The position system 7, through VCM 6, positionally maintains and/or moves head 4 radially over the desired data on disks 3. A read channel 8 converts an analog read signal from head 4 into digital form. A write channel 9 provides data in analog form to read/write head 4 for storing on a disk 3. A pre-amplifier 10 suitably conditions data read from and data to be written to disk 4. Channel controller 11 recognizes and organizes the digital data from the read channel 8 and digital data to be sent to write channel 9 into bytes of data. An interface adapter 12 provides an interface between channel controller 11 and a system bus 13 that may be particular to the host (data storage and/or computer-based) system. The host system will also typically have other devices that communicate on system bus 13, including a central processing unit ("CPU") 14 and memory 15.

A spindle motor ("SPM") 16 rotates disk 3 and is controlled by a SPM control circuit 17 having electronics for maintaining the spindle motor 16 at the proper angular velocity and for performing-a memory access operation (read or write operation). The SPM control circuit 17 may communicate with interface adapter 12. Alternatively, SPM control circuit 17 may be controlled by or otherwise communicate with channel controller 11. It is understood that disk drive 2 may be divided into and/or include other function blocks from those shown in FIG. 1a.

Figure 1B:
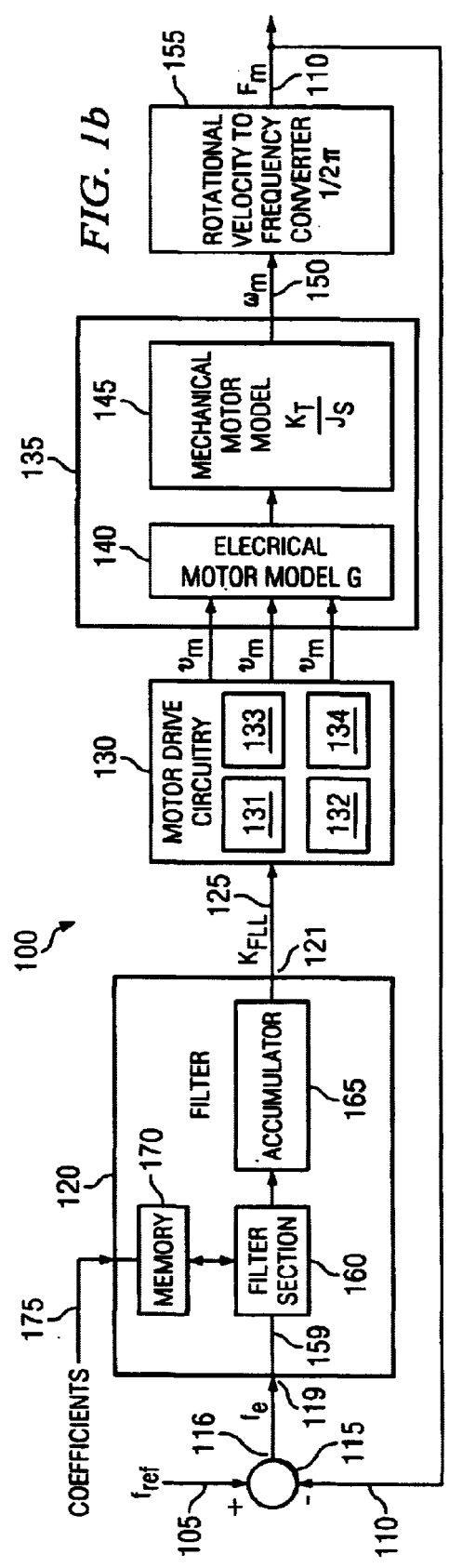
FIG. 1b is a block diagram dynamic model of a velocity control loop for controlling the velocity of a motor.

FIG. 1b is a dynamic model of a velocity control loop 100 or frequency lock loop (FLL). The velocity control loop 100 is generally located within, but operates independent of, a position control loop (not shown) that controls the object, in this case the disk, to be in a certain position at a certain time. The velocity control loop 100 should operate at a higher operating frequency than the position control loop to provide for proper loop dynamics for the position control loop. As a result of the higher operating frequency for the velocity control loop 100, compensation and computations therefore are performed at a higher frequency, thereby demanding a significant amount of processing resources. The principles of the present invention offloads; the processing for compensating the velocity control loop from the controller 11 of the disk drive 2 to a separate device within the SPM control circuit 17.

The velocity control loop 100 has an input terminal 105 for receiving a reference frequency signal $f_{ref}$. An output terminal 110 of the velocity control loop 100 operates as a feedback line 110 and carries a motor frequency signal $f_m$. A frequency detector 115 is connected to both the input terminal 105 and the feedback line 110. Alternatively, a phase detector or summing junction may be utilized. The frequency detector 115 produces an error frequency signal $f_e$ at an output terminal 116 thereof. As is well understood in the art of automatic control systems, to produce the error frequency signal $f_e$, either the reference frequency signal $f_{ref}$ and the motor frequency signal $f_m$ have opposite polarities or a difference operator (−) may be utilized.

The output terminal 116 of the frequency detector 115 is connected to an input terminal 119 of a filter 120 having an output terminal 121. The filter 120 provides filtering or compensation to the error frequency signal $f_e$. The output terminal 121 of the filter 120 is connected to motor drive circuitry 130.

The motor drive circuitry 130 comprises several circuits, including a signal amplifier 131, a duty cycle generator (e.g., pulse width modulator (PWM) 132), a pre-amplifier 133, and a power-amplifier 134. The motor drive circuitry may additionally include a multiplier. The motor drive circuitry 130 is connected to a motor 135 having three coils or windings for driving the motor, which utilizes three input lines to carry motor voltage input signals $v_m$. It should be understood that the motor 135 could have a different number of windings and, therefore, have a different number of motor voltage input signals.

The motor 135 may be theoretically represented by two motor models, an electrical motor model 140 and a mechanical motor model 145. Each model represents the dynamics (i.e., the electrical and mechanical dynamics) that form the basis to the velocity loop characteristics. Both the electrical motor model 140 and the mechanical motor model 145 have mathematical terms, generally polynomials, that define the dynamics of the motor 135. The output terminal 150 of the motor 135 is connected to the input of a rotational velocity to frequency converter 155, which is the output element of the velocity control loop 100.

As described, the reference frequency signal $f_{ref}$ is the input signal or control signal into the velocity control loop 100. The reference frequency signal $f_{ref}$ is a sinusoid for controlling the motor 135, however, other reference frequency signals $f_{ref}$ are capable of being utilized for controlling the motor (spin) frequency according to the principles of the present invention. The output motor frequency $f_m$, which is the measured or actual frequency of the motor, is used as a feedback signal for the velocity control loop 100.

The velocity control loop 100 is designed as a regulator to maintain the motor 135 at a constant angular velocity. To maintain the motor 135 at a constant-angular velocity, the error frequency signal $f_e$ is desired to be zero, indicating that the actual motor frequency signal $f_m$ and the reference frequency signal $f_{ref}$ are tracking perfectly. However, it is virtually impossible to obtain perfect tracking (i.e., zero error) in the real world due to real world dynamics, including acoustic noise, motor wear out, torque ripple, speed control accuracy, friction, external disturbances, temperature variations, and other factors.

The filter 120 is designed to provide compensation to alter the dynamics of the closed-loop system, which is the velocity control loop 100 for the present example. The filter 120 filters (i.e., attempts to minimize the error frequency signal $f_e$) the error frequency signal $f_e$ and produces a compensated signal $K_{FLL}$ on line 125 that is applied to the motor drive circuitry 130. The filter 120 attempts to minimize the error frequency signal $f_e$ by having the filter coefficients selected by considering mechanical and electrical dynamics of the motor 135 and by having an integrator to remove steady-state error from the error frequency signal $f_e$. The motor drive circuitry 130 receives and amplifies $K_{FLL}$, and generates a pulse width modulated signal from the PWM 132. The pulse width modulated signal is amplified by the pre-amplifier 133 and power amplifier 134 to produce the motor voltage(s) $v_m$ for powering the motor 135. It should be understood that the motor drive signal $v_m$ can be either voltage or current depending upon the motor 135 to provide power to the motor 135 to spin at a constant angular velocity.

The output of the motor 135 is a motor angular velocity $\omega_m$. The motor angular velocity $\omega_m$ is measured by detecting the back-emf developed by the motor. This can be performed for a brushless motor. Alternatively, a tachometer or optical encoder (not shown) can detect the motor angular velocity $\omega_m$ to provide an electric signal. The rotational-velocity-to-frequency-converter 155 converts the motor angular velocity signal $\omega_m$ to a motor frequency signal $f_m$ by converting the motor angular velocity signal $\omega_m$ from radians/second to degrees/second. The reference frequency signal $f_{ref}$ has the same units as the motor angular velocity signal $\omega_m$.

The velocity control loop 100 may be implemented in a variety of ways for handling the format of the signals. The signals shown may be digital or analog signals. If the signals are digital, the error frequency signal $f_e$ could be a 12-bit digital signal and both the reference frequency signal $f_{ref}$ and the motor frequency signal $f_m$ would also be 12-bit digital signals. If the signals are analog, then it may be necessary, depending upon the design of the particular components around the velocity control loop 100, to have analog-to-digital (A/D) and digital-to-analog (D/A) converters included at various locations within the loop as would be understood by one skilled in the art. Also, depending upon the tolerances on the velocity control loop 100, lower resolution digital signals (e.g., 8-bit) or higher resolutions digital signals (e.g., 16-bit) may be used.

Before describing the implementation of the filter 120, it is important to understand the requirements of the system to make the system stable. Stability of the velocity control loop 100 should be understood in the traditional automatic control systems sense of the word, which is that the system is controllable (i.e., the error frequency $f_e$ does not grow to infinity or oscillate). The stability of the system may be analyzed by an open-loop transfer function.

Figure 2A:
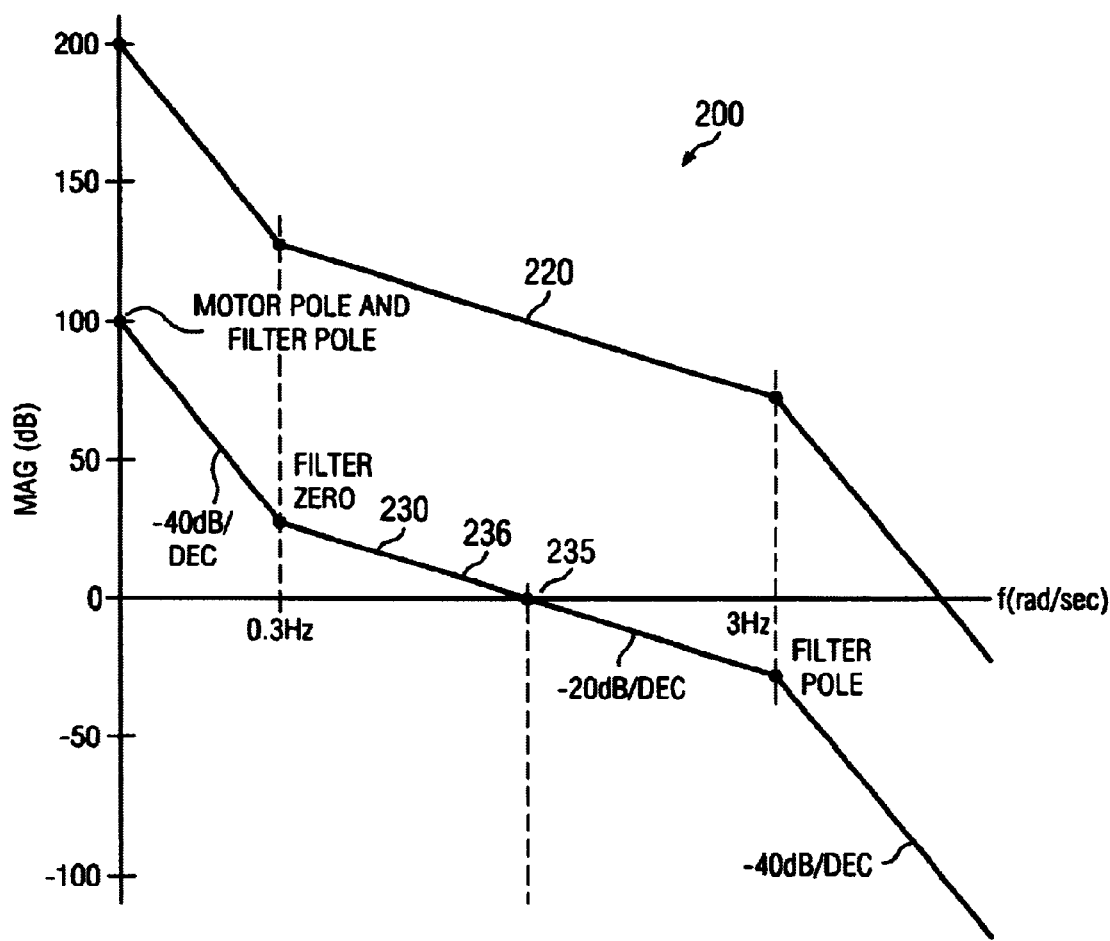
FIGS. 2a and 2b are representative open-loop magnitude and phase plots (i.e., Bode plot) of the control loop of FIG. 1b.
Figure 2B:
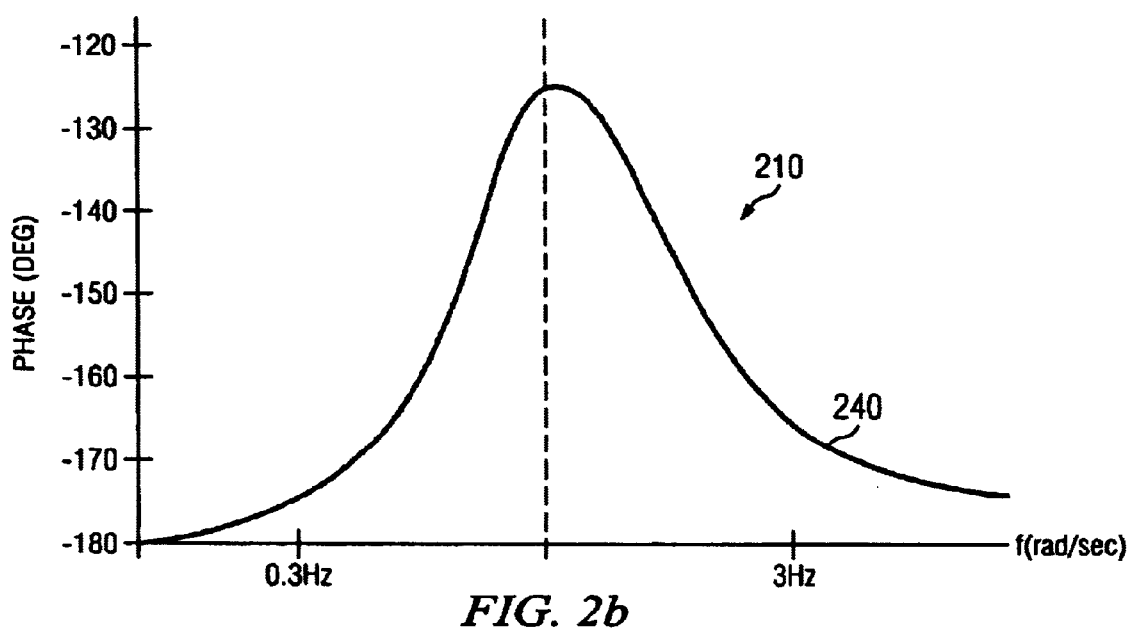

FIGS. 2a and 2b show an open-loop transfer function (i.e., Bode plot) of the velocity control loop 100. Magnitude plot 200 shows a pair of magnitude versus frequency curves 220 and 230 indicating the gain characteristics over frequency of the open-loop velocity control loop 100. Phase plot 210 shows a phase versus frequency curve 240 indicating the phase characteristics of the open-loop velocity control loop 100. The two plots 200 and 210 are generally viewed together, as shown, to determine stability characteristics of the system.

The open-loop transfer function of the system includes a pole at a very low frequency, essentially at the origin, due to the mechanical time constant of the motor. This low frequency pole indicates the need for a low bandwidth complete open-loop transfer function to maintain stability. Generally, the open-loop bandwidth is in the order of a less than a few Hertz, although the principles of the present invention could be applied to systems having a higher bandwidth. The low frequency pole makes it desirable to include an integrator to maintain the motor target speed and have the error frequency $f_e$ decay to zero.

Bode plot 200 contains two exemplary magnitude curves 220 and 230. Both of these magnitude curves 220 and 230 are exemplary of possible open-loop transfer functions of the velocity control loop 100. The spacing between the two magnitude curves 220 and 230 represent a gain difference, where magnitude curve 230 has a lower gain than does magnitude curve 220. As is understood in the art of automatic control systems, the zero dB crossover frequency 235 dictates stability of the system with regard to phase margin (i.e., the number of degrees above the −180 degree line that the phase curve 240 is at the zero dB crossover frequency 235). As shown in the magnitude plot 200, the phase margin is about fifty-five degrees for magnitude curve 230 and ten degrees for magnitude curve 220.

Stability and controllability are also functions of the slope of the magnitude curve when crossing the zero dB line. A general rule of thumb is to cross the zero dB line at −20 decibels/decade (dB/dec). The magnitude curve 230 has approximately a −20 dB/dec slope at magnitude curve section 236. To achieve stability and controllability with the velocity control loop 100, the filter 120 is designed to properly shape the magnitude curve 230 and the phase curve 240.

One embodiment of a properly designed filter 120 for compensating the velocity control loop 100 having dynamics described above includes a second order filter having two poles and one zero. A zero is placed at a first frequency, generally a low frequency. This low frequency zero provides for the magnitude curve section 236 to cross the zero dB line at −20 dB/dec. As previously mentioned, a pole is placed at the origin (i.e., integrator) in the filter 120 design to eliminate steady-state error. Finally, a pole is placed at a higher frequency than the frequency of the zero (e.g., at least a decade above the frequency that the zero is placed) The magnitude plot 200 shows the open-loop transfer function (i.e., magnitude curve 230) having different slopes as a result of the placement of the zeros and poles.

The filter 120 as described above is a second order transfer function (i.e., polynomial having two poles). The second order transfer function can be realized by a second order infinite impulse response (IIR) filter to make the system fast to react to speed perturbations in maintaining the stability of the velocity loop 100. The transfer function in the s-domain for the desired filter is:

$$T(s) = \frac{K(\tau_z \cdot s + 1)}{s(\tau_p \cdot s + 1)} \text{ where } \tau_z = \frac{1}{2\pi f_z}; \tau_p = \frac{1}{2\pi f_p} \quad (1)$$

K is a gain variable, $\tau_z$ is the zero frequency variable, and $\tau_p$ is a pole variable. The s-domain variable "s", of course, is a LaPlace variable in the continuous time domain, where s=jω with ω ranging from −∞ to +∞, and j is the square root of −1. According to the principles of the present invention, to simplify the implementation of the filter 120, the s-domain transfer function T(s) can be split into a first order polynomial in cascade with an integrator (i.e., 1/s). The split filter implementation greatly reduces the complexity of implementing a second order filter mainly due to the placement of the pole at the origin.

Figure 3:
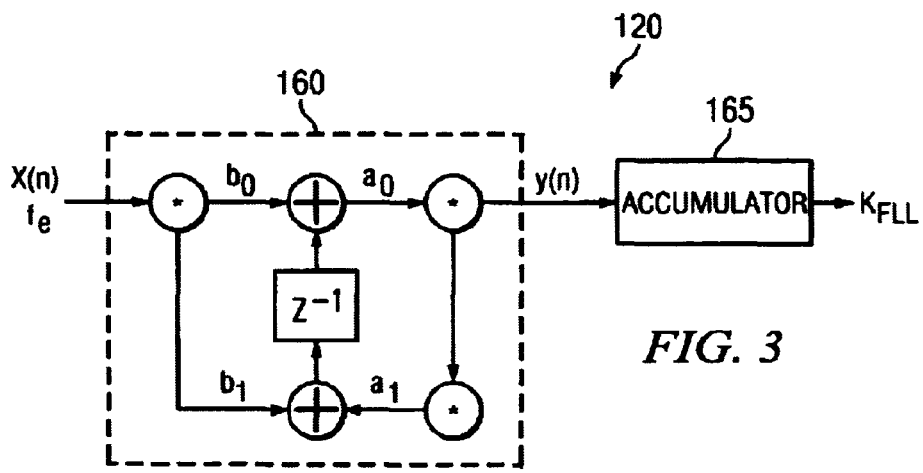
FIG. 3 is a representative first order infinite impulse response filter structure of a filter within the control loop of FIG. 1b.

FIG. 3 is a representation of the first order filter implementation and is derived from a transposed diagram of an IIR filter using a bilinear transformation with pre-warping, which is a function of a sampling frequency being dependent on the motor spin frequency and number of poles in the motor. The bilinear transformation is a standard mathematical operation for converting an s-domain polynomial to a z-domain polynomial. Digital filters are modeled from the resulting z-domain polynomial.

The first order polynomial of the s-domain transfer function T(s) in the z-domain (i.e., discrete sampled time domain) is represented by:

$$T_1(z) = \frac{(az + b)}{(cz + d)} \quad (2)$$

where a,b,c,d are coefficients. The z-domain variable "z", of course, is a LaPlace variable in the discrete time domain. One way to reduce the number of coefficients from four to three is to divide each of the coefficients by the coefficient b so that the resulting transfer function is:

$$T(z) = \frac{\left(\frac{a}{b}z + 1\right)}{\left(\frac{c}{b}z + \frac{d}{b}\right)} \quad (3)$$

The remaining three parameters (i.e., a/b, c/b, d/b) make it easy to adjust gain, frequency of the zero, and frequency of the pole. Having three parameters additionally reduces real-time computations, storage space, and download time. The z-domain transfer function can be further modified to be in a more filter friendly form:

$$T_1(z) = \frac{b_0 + b_1 z^{-1}}{a_0 + a_1 z^{-1}} \quad (4)$$

where $a_0$, $a_1$, $b_0$, $b_1$, are coefficients derived from a,b,c,d and $z^{-1}$ is a previous state variable.

The integrator in the s-domain transfer function (1) is 1/s. The corresponding z-domain transfer function for the integrator is:

$$T_2(z) = \frac{z}{z-1} = \frac{1}{1-z^{-1}} \quad (5)$$

Cascading the two z-domain transfer functions, $T_1(z)$ and $T_2(z)$, produces essentially the same frequency response as the s-domain transfer function T(s). However, having the two z-domain transfer functions, $T_1(z)$ and $T_2(z)$, makes implementation a simpler task.

Referring again to FIG. 1b, the filter 120 comprises a filter section 160 having an input terminal 159 connected to the input terminal 119 of the filter 120. The filter section represents the first order IIR filter as described by $T_1(z)$. However, if the filter 120 is to be a higher order filter, such as a third order filter, a second order IIR filter can be implemented in the filter section 160. Additionally, the filter 120 comprises an accumulator 165 and a memory 170.

The accumulator 165, which is an adder with feedback (by definition), represents the integrator (i.e., 1/s) in a digital form as described by $T_2(z)$. By designing the filter 120 with a first order filter in the filter section 160 cascaded with the integrator 165, which drives the error frequency signal $f_e$ to zero, the filter section 160 is reduced by an order. The lower order filter makes processing of the filter section 160 faster and reduces the complexity of the filter section 160.

The memory 170 is connected to the filter section 160 and connects to an external bus 175 that carries coefficients transmitted from, for example, an external processor or boot module, to be used in the filter section 160. The memory stores the coefficients used by the filter section 160, which may be 12-bit digital values, but may be longer or shorter digital values depending upon the desired resolution and tolerance of the velocity control loop 100.

The filter 120, as described contains a filter section 160 and an accumulator 165 and receives digital inputs. However, it should be understood that A/D and D/A converters could be embedded within the filter 120 so that an analog error frequency signal $f_e$ and/or an analog output signal could be utilized by the filter 120. For example, an A/D converter could be connected between the input terminal 119 of the filter 120 and the filter section 160 so that the error frequency signal $f_e$ could be an analog signal and a D/A converter could be connected between the accumulator 165 and the output terminal 121 of the filter 120. Having D/A and A/D converters allows a digital filter (e.g., filter section 160a) to be utilized within the velocity control loop 100 having all other components being analog.

The memory 170 within the filter 120 stores the filter coefficients. The memory 170 may be a register comprising flip-flops or other storage elements, random access memory (RAM), EPROM, EEPROM, volatile or non-volatile memory. A different embodiment may use read only memory (ROM), however, having the ability to receive and dynamically alter filter coefficient via memory addressing during operation allows the filter 120 to be more versatile. The dynamic altering of filter coefficients in the filter 120 allows the filter 120 to be utilized in a plethora of different applications having a variety of velocity control modes. Additionally, the filter 120 can be utilized in applications other than velocity control, such as position, acceleration, and force control with the understanding that the coefficients would be different due to different dynamics.

The external bus 175 carries the filter coefficients to the filter 120. The external bus 175 may be a serial bus or a parallel bus, however, a serial bus allows the filter 175 to have fewer external connections. As is generally understood, memory addressing techniques are utilized to store each coefficient in the proper memory location. The filter 120 may utilize similar memory addressing techniques to apply each filter coefficient to the filter section 160.

Reference is again made to FIG. 3, which is an exemplary filter 120 having an embodiment of the filter section 160 (FIGURE 1b). The filter section 160 includes a representative first order filter structure representative of the z-domain transfer function $T_1(z)$, where $b_0$ and $b_1$ are numerator terms representing the zero and gain and $a_0$ and $a_1$ are denominator terms representing the pole. The filter section 160 receives an input signal x(n), where n represents a particular datum within the error frequency signal $f_e$, and outputs a compensated signal y(n). The filter section 160 is a pre-defined filter structure (i.e., the structure exists) and the filter coefficients are dynamically modified (i.e., changed before and/or during filtering operation) to change the filter dynamics.

The first order IIR filter structure is a traditional IIR filter structure. The filter 120 may be implemented in a variety of forms, such as a digital integrated circuit. The digital integrated circuit provides a small, inexpensive, and versatile solution for realizing the filter 120. Additionally, the digital integrated circuit is essentially unaffected by external environmental conditions because no external passive components for setting filter coefficients are needed. Other forms or structures of filters are also considered viable to implement the first order filter including a processor operating the filter 120.

It should be understood that other embodiments of the filter section 160 could be utilized to produce the same or similar functionality and be consistent with the principles of the present invention. For example, the filter section 160 could be a finite impulse response (FIR) filter structure implemented in hardware (i.e., within the digital integrated circuit) or software operating in a processor or another programmable device. The frequency lock loop could also be implemented as a phase lock loop (PLL), which would mandate that the compensator (i.e., filter 120) would have different coefficients and/or a different structure.

Figure 4:
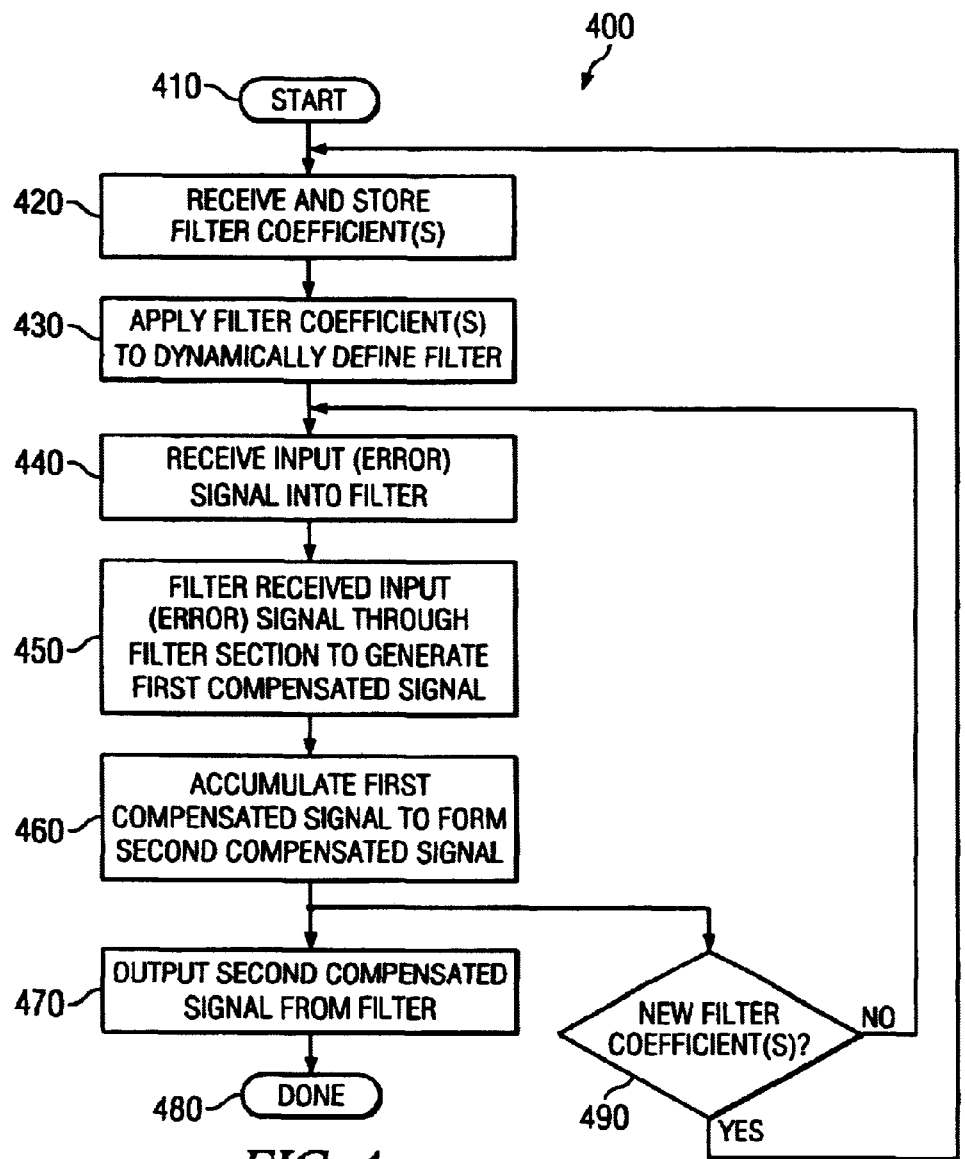
FIG. 4 is a representative flow diagram of the operation of the filter of FIG. 1b.

FIG. 4 is a flow diagram 400 of the operation of the filter 120. The process starts at step 410. At step 420, the filter coefficient(s) are received and stored in the memory 170. At step 430, filter coefficient(s) are applied to filter section 160 to dynamically define the filter in the filter section 160. Dynamically defining the filter means that the filter coefficients within the filter section 160 may be altered at any point in time to change the filter dynamics. Also, one or more filter coefficients may be received, stored, and applied to the filter section 160. It should be understood that the steps of storing and applying the filter coefficients may be considered a single step.

At step 440, the input signal is received by the filter 120. The input signal may be the error frequency signal $f_e$ as considered by the structure of FIG. 1b. Other signals may be equally possible to be received by the filter 120, including error signals not associated with the motor frequency $f_m$ and other measured or generated signals.

At step 450, the received input signal into the filter 120 is filtered by the filter section 160a. Because the filter section 160a is a first order digital filter, the mathematical operations performed by the filter section 160a occur between the time intervals of receiving each datum.

At step 460, the output of the filter section 160, which forms a first compensated signal within the filter 120, is received by and accumulated within the accumulator 165, which is a second compensated signal of the filter 120. The second compensated signal is output from the filter 120 at step 470. At step 480, the process is done.

Between steps 460 and steps 470, step 490 determines whether new filter coefficient(s) are received into the filter 120. If new filter coefficient(s) are received, then the process returns to step 420 where the filter coefficient(s) are received and stored. If no new filter coefficient(s) are received, then the process of receiving and compensating the input signal from steps 440 through 460 is continued.

It should be understood that the embodiment shown in FIG. 4 is exemplary and that other configurations that perform the same functionality are possible. For example, another embodiment of FIG. 4 includes having step 490 being located after step 470. Step 490 may alternatively be an independent process from the filtering process of the flow diagram 400. If A/D and D/A converters are part of the filter 120, then additional steps for those functions would be present before step 450 and after step 460, respectively.

An exemplary application of the present invention comprises a computing device having a disk drive, which utilizes an automatic control system for controlling the velocity of the disk (i.e., storage medium). The automatic control system contains the velocity control loop 100 having the filter 120. It should be understood that the disk drive may be internal or external to the computing device and that the disk drive may be one disk drive within a network of storage devices. Furthermore, the computing device could be any computing device, including: a laptop computer, a personal computer, or a mainframe computer, for example. The disk drive may also be a compact disk (CD) drive or a digital video disk (DVD) drive having the filter 120 in the velocity control loop 100.

Another exemplary application of the present invention includes compact disk player, which is used to play music or data. The compact disk player may utilize an automatic control system having the filter 120 to compensate the velocity control loop 100. The velocity control loop 100 regulates the angular velocity of the motor to spin the compact disk at a constant angular velocity.

The computing device and compact disk player are exemplary applications that the principles of the present invention may be utilized. Applications other than spinning a disk are also contemplated by the principles of the present invention. In fact, virtually any system having a velocity control loop for controlling the angular velocity of a DC motor can utilize the principles of the present invention. Furthermore, as earlier stated, the filter 120 may be applied to non-velocity control loop applications, such as position, acceleration, and force control and the filter coefficients would be different due to different dynamics for the non-velocity control loop application. For example, an application for the automobile industry includes a velocity control loop for regulating the velocity of a fan motor for an air-conditioning unit. The principles of the present invention may also be applied to digital signal processing applications.

While the above discussion considered the velocity control loop 100 for the incorporation of the filter 120, it is conceivable that other applications may not require a pole at the origin (i.e., integrator), but filter 120 would instead be designed with multiple poles where none are located at the origin. A filter 120 could be designed with multiple cascaded first order or higher filter structures, thereby maintaining the fast processing, simple design concepts. Each filter structure would, of course, be capable of dynamically receiving and applying filter coefficients.

The previous description is of a preferred embodiment for implementing the invention, and the scope of the invention should not necessarily be limited by this description. The scope of the present invention is instead defined by the following claims.

What is claimed is:

1. A disk drive comprising:
   a motor for spinning a disk, the motor having input terminals for receiving control signals;
   a control loop for controlling the motor, the control loop comprising:
      an input terminal for receiving a reference control signal;
      an output terminal for providing a feedback signal from the motor, the feedback signal being indicative of operating characteristics of the motor;
      means for generating an error signal based upon the reference control signal and the feedback signal, the means having a plurality of input terminals, the input terminal of the velocity control loop being connected to a first input terminal of the means and the output terminal of the velocity control loop being connected to a second terminal of the means, the means further having an output terminal to carry the error signal;
      a filter being at least a second order filter connected to the output terminal of the means, the filter comprising:
         a filter section being one order below the filter, the filter section having an output terminal for supplying a first compensated signal; and
         an accumulator having an input terminal connected to the output terminal of the filter section and an output terminal electrically connected to an output terminal of the filter.

2. The disk drive according to claim 1, wherein the filter comprises a digital integrated circuit.

3. The disk drive according to claim 1, wherein at least one filter coefficient is received by the filter section, the filter section having a transfer function defined by the at least one filter coefficient.

4. The disk drive according to claim 3, wherein the filter coefficients are digital values received from a bus connected to the filter.

5. The disk drive according to claim 1, wherein the filter section is an infinite impulse response filter.

6. The disk drive according to claim 1, wherein the disk drive is one of a plurality of storage devices operating within a network of storage devices.

7. The disk drive according to claim 1, wherein the control loop is a velocity control loop.

8. The disk drive according to claim 1, wherein the disk drive is included within a system, the system having a processor for performing computations and/or logical operations.

9. A control loop for controlling a motor, the control loop comprising:
   an input terminal for receiving a reference control signal;
   an output terminal for providing a feedback signal from the motor, the feedback signal being indicative of operating characteristics of the motor;
   means for generating an error signal based upon the reference control signal and the feedback signal, the means having a plurality of input terminals, the input terminal of the velocity control loop being connected to a first input terminal of the means and the output terminal of the velocity control loop being connected to a second terminal of the means, the means further having an output terminal to carry the error signal;
   a filter being at least a second order filter connected to the output terminal of the means, the filter comprising:
      a filter section being one order below the filter, the filter section having an output terminal for supplying a first compensated signal; and
      an input terminal for receiving at least one filter coefficient, the at least one filter coefficient defining a transfer function of the filter section;
      an acumulation having an input terminal connected to the output terminal of the filter section and an output terminal electrically connected to an output terminal of the filter.

10. The control loop according to claim 9, wherein the filter coefficients are digital values received from a bus connected to the filter.

11. The control loop according to claim 9, wherein the filter section is an infinite impulse response filter.

12. The control loop according to claim 9, wherein the control loop includes at least one of the following control loops: a velocity control loop, a position control loop, an acceleration control loop, and a force control loop.

13. The control loop according to claim 9, wherein the filter comprises a digital integrated circuit.

14. The control loop according to claim 9, wherein the control loop is included within a disk drive.

15. A method for compensating a control loop within an automatic control system, the method comprising the steps of:
   receiving an error signal to be filtered;
   filtering the error signal, the filtering step comprising the steps of:
      performing an infinite impulse response filtering to generate a first compensated signal; and
      accumulating the first compensated signal to generate a second compensated signal; and
   outputting the second compensated signal, the second compensated signal being utilized for providing a control signal to a device being controlled by the control loop.

16. The method according to claim 15, further comprising the steps of:
   dynamically receiving at least one filter coefficient; and
   defining filter characteristics for the infinite impulse response filtering-based upon the received at least one filter coefficient.

17. The method according to claim 15, wherein the step of receiving the at least one filter coefficient is performed serially.

18. The method according to claim 15, wherein the infinite impulse response filtering is a first-order infinite impulse response filtering.

19. The method according to claim 15, wherein the control loop is at least one of the following:
   a position control loop;
   a velocity control loop;
   an acceleration control loop; or
   a force control loop.

20. A system comprising:
   a processor for performing computations and/or logical operations; and
   a motor for spinning a disk, the motor having input terminals for receiving control signals;
   a control loop for controlling the motor, the control loop comprising:
      an input terminal for receiving a reference control signal;
      an output terminal for providing a feedback signal from the motor, the feedback signal being indicative of operating characteristics of the motor;
      means for generating an error signal based upon the reference control signal and the feedback signal, the means having a plurality of input terminals, the input terminal of the velocity control loop being connected to a first input terminal of the means and the output terminal of the velocity control loop being connected to a second terminal of the means, the means further having an output terminal to carry the error signal;
      a filter being at least a second order filter connected to the output terminal of the means, the filter comprising:
         a filter section being one order below the filter, the filter section having an output terminal for supplying a first compensated signal; and
         an accumulator having an input terminal connected to the output terminal of the filter section and an output terminal electrically connected to an output terminal of the filter.

21. The system according to claim 20, wherein the system includes at least one of the following:
   a computing device,
   an audio player; or
   a digital video disk player.

22. The system according to claim 20, wherein the control loop is a velocity control loop.

23. The system according to claim 20, wherein the filter comprises a digital integrated circuit.

24. The system according to claim 20, wherein the filter section is defined by at least one filter coefficient, the at least one filter coefficient being a digital value received from a bus connected to the filter.

25. The system according to claim 20, wherein the filter section includes an infinite impulse response filter.

26. An integrated circuit for processing a signal comprising:
   an input signal terminal for receiving an input signal;
   a filter section electrically connected to the input signal terminal, the filter section dynamically receiving at least one filter coefficient to compensate the input signal to produce a first compensated signal, the filter section further having an output terminal;
   an accumulator having at least one input terminal and an output terminal, the accumulator producing a second compensated signal, the output terminal of the filter section connected to the at least one input terminal of the accumulator; and
   an output terminal electrically connected to the output terminal of the accumulator for outputting the second compensated signal.

27. The integrated circuit according to claim 26, wherein the integrated circuit is a digital integrated circuit.

28. The integrated circuit according to claim 26, wherein the filter section further includes an infinite impulse response filter, the infinite impulse response filter being at least a first order filter.

29. The integrated circuit according to claim 26, further comprising at least one storage element for storing the at least one filter coefficient.

30. The integrated circuit according to claim 26, a bus.

31. The integrated circuit according to claim 26, further comprising an analog to digital converter electrically connected between the input signal terminal and the filter section.

32. The integrated circuit according to claim 26, further comprising a digital to analog converter electrically connected between the accumulator and the output terminal.

33. An apparatus comprising:
   means for receiving an input signal; and
   means for filtering the input signal, the means for filtering comprising:
      means for performing a first filtering of the input signal to create a first filtered signal;
      means for dynamically receiving at least one filter coefficient, the at least one filter coefficient being applied to the means for performing a first filtering; and
      means for performing a second filtering, the means for performing a second filtering receiving the first filtered signal.

34. A programmable digital integrated circuit for compensating a velocity control loop, the digital integrated circuit comprising:
   an input terminal for receiving an input signal;
   an output terminal for delivering a compensated input signal;
   a serial bus terminal for receiving filter coefficients provided in a digital format;
   a digital filter section having an input terminal, an output terminal, and a terminal for dynamically receiving coefficients, the input terminal of the filter section coupled to the input terminal of the integrated circuit, the filter section having dynamic characteristics defined by the coefficients received by the serial bus terminal; and
   an integrator having an input terminal coupled to the output terminal of the filter section and having an output terminal coupled to the output terminal of the integrated circuit.

35. The programmable digital integrated circuit according to claim 34, wherein the filter section is a first order digital filter.

* * * * *

UNITED STATES PATENT AND TRADEMARK OFFICE
CERTIFICATE OF CORRECTION

| | |
|---|---|
| PATENT NO. | : 6,614,612 B1 |
| APPLICATION NO. | : 09/625068 |
| DATED | : September 2, 2003 |
| INVENTOR(S) | : Whitney Hui Li et al. |

It is certified that error appears in the above-identified patent and that said Letters Patent is hereby corrected as shown below:

Column 12, claim number 9, line number 27, please replace the word [acumulation] with the word -- accumulator --.

Column 14, claim number 30, line number 18, please insert the phrase -- wherein the at lease one filter coefficient is received on -- before the words "a bus."

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,614,612 B1 | |
| APPLICATION NO. | : 09/625068 | |
| DATED | : September 2, 2003 | |
| INVENTOR(S) | : Whitney Hui Li et al. | |

It is certified that error appears in the above-identified patent and that said Letters Patent is hereby corrected as shown below:

Column 12, claim number 9, line number 27, please replace the word [acumulation] with the word -- accumulator --.

Column 14, claim number 30, line number 18, please insert the phrase -- wherein the at least one filter coefficient is received on -- before the words "a bus."

This certificate supersedes the Certificate of Correction issued April 10, 2012.

Signed and Sealed this
Twenty-sixth Day of June, 2012

David J. Kappos
*Director of the United States Patent and Trademark Office*